Aug. 13, 1929. C. J. KRYZANOWSKY 1,724,716
LIQUID LEVEL GAUGE
Filed Sept. 14, 1926 3 Sheets-Sheet 2
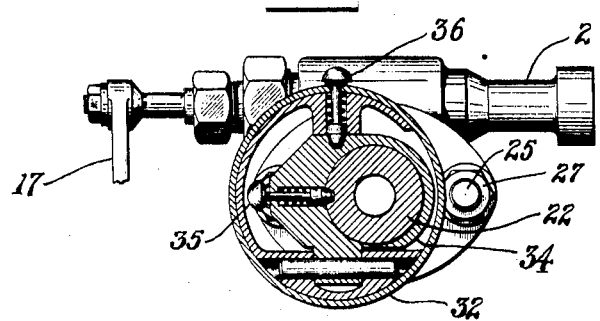
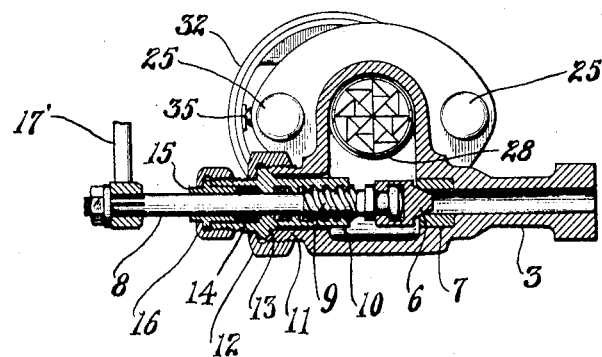
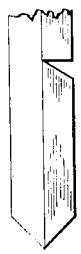
INVENTOR
Constant J. Kryzanowsky

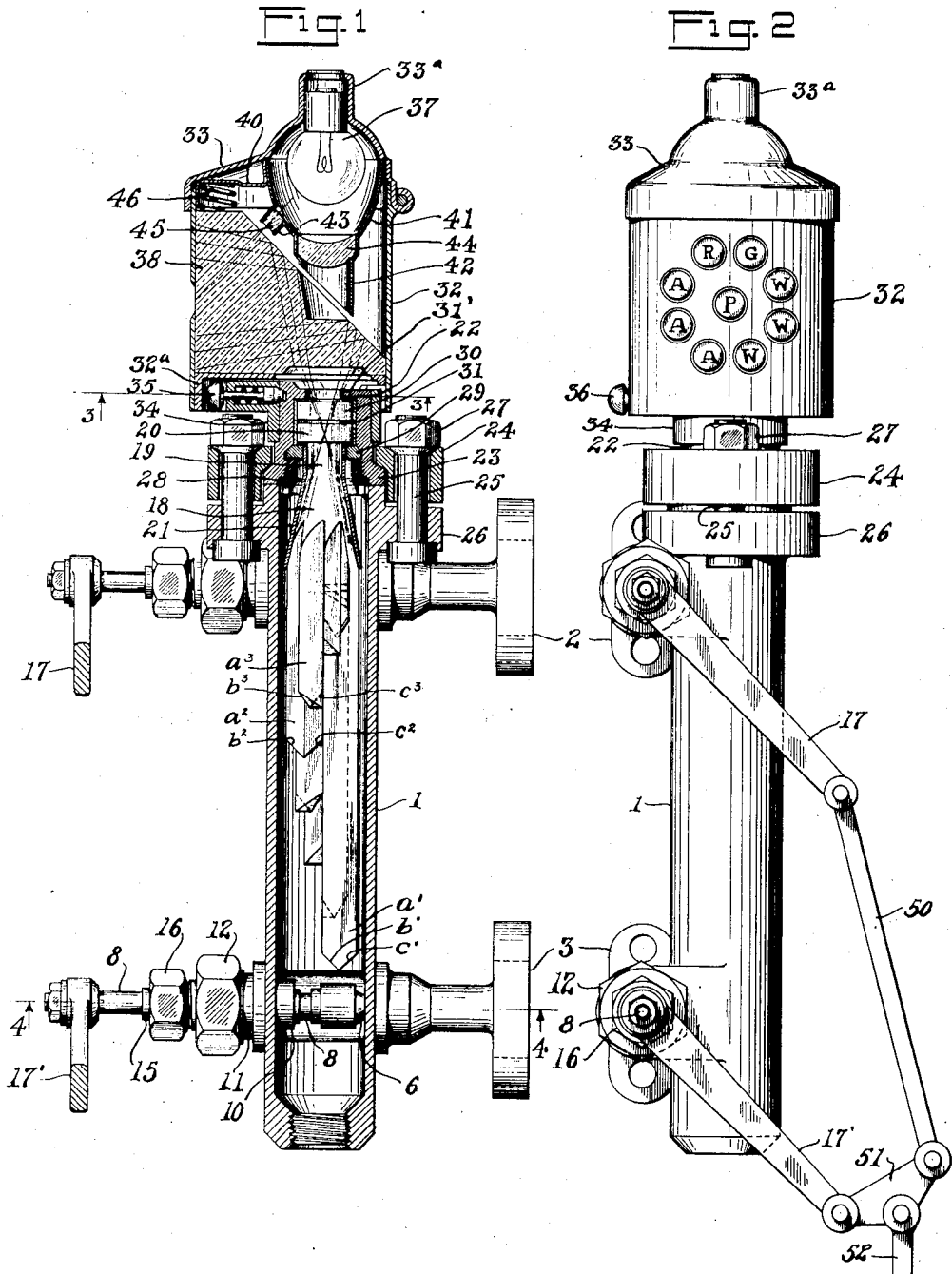

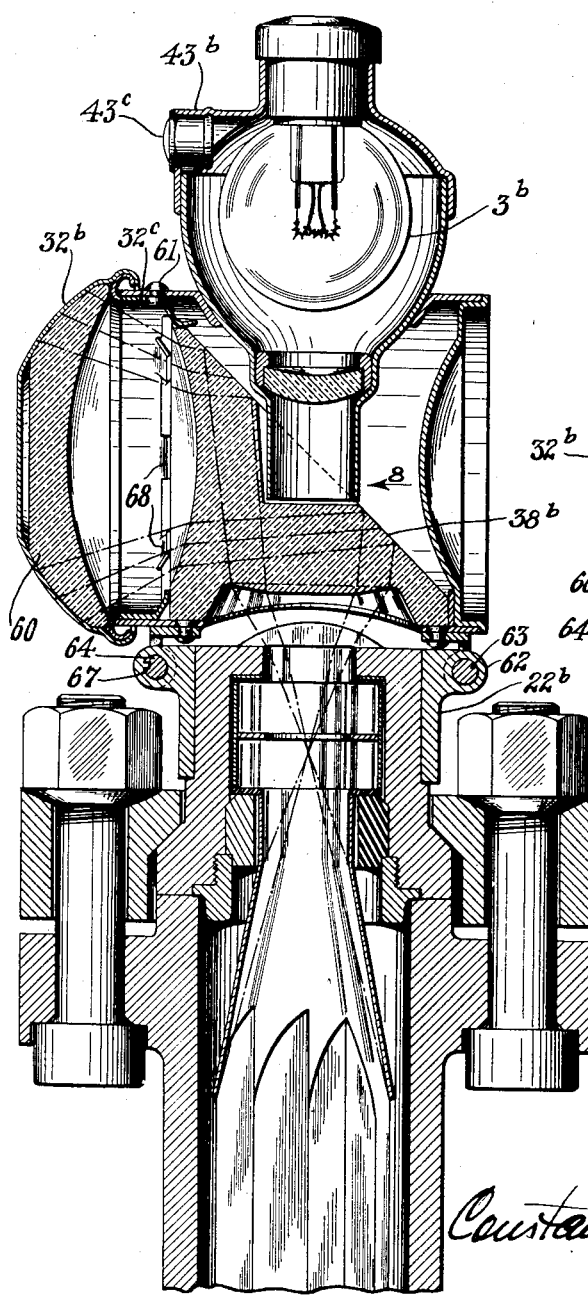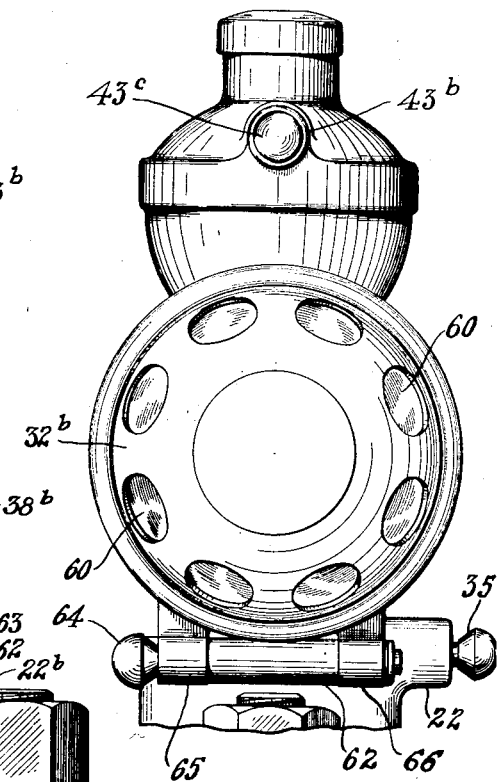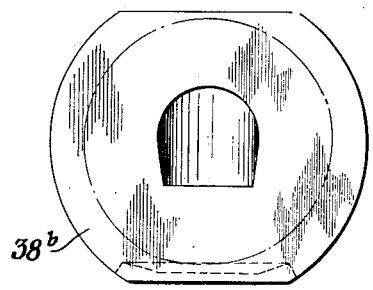

Patented Aug. 13, 1929.

1,724,716

UNITED STATES PATENT OFFICE.

CONSTANT J. KRYZANOWSKY, OF BALTIMORE, MARYLAND.

LIQUID-LEVEL GAUGE.

Application filed September 14, 1926. Serial No. 135,406.

This invention relates to improvements in liquid level gauges.

The invention consists in the features, details of construction and combinations of parts which will first be described in connection with the accompanying drawings and then particularly pointed out.

The drawings illustrate an embodiment of the invention particularly advantageous in a water-level indicator for steam boilers, tanks and the like.

In these drawings—

Figure 1 is a vertical section through a gauge embodying the invention;

Figure 2, a side elevation of the same;

Figure 3, a horizontal section on the line 3—3, Fig. 1;

Figure 4, a horizontal section, partly in elevation, on the line 4—4, Fig. 1;

Figure 5, a detail view illustrating a modified form of the shortest prismoidal body;

Figure 6, a detail section of a modification of the invention;

Figure 7, a front view of the same and Fig. 8 a view of large prism looking in the direction of the arrow 8 in Fig. 6.

Referring to the drawings, 1 is a receptacle similar to the ordinary water-column of a boiler, this receptacle being arranged to be connected with a boiler by suitable pipe connections, one of which is below the lowest level of the water in the boiler and the other above the highest level of the water in said boiler. These pipe connections are indicated at 2 and 3 respectively and in the best embodiment of the invention each is provided with a valve device whereby the connections may be closed off from the boiler at any time in case it is desired to remove the parts of the gauge for cleaning or repair.

As these valve devices are both alike the description of one will suffice. The lower one for the pipe connection 3 is selected for description. This valve device has a valve 6, arranged to close against a removable seat 7, mounted in the pipe connection 3. The valve 6 is mounted on the end of a valve-stem 8, having a screw-threaded portion 9, coacting with a nut device 10, removably secured in a neck 11, carried by the receptacle at one side of its central longitudinal axis. The said nut device is held to the corresponding neck by a threaded collar 12, screwed to the neck and engaging a flange 13, of the nut device 10, which flange is coned on its inner face and fits watertight against a correspondingly oppositely-coned surface on the neck 11. The outer end of the nut device 10 is provided with a suitable packing device comprising the packing 14, a gland 15, and a threaded collar or nut 16 screwed onto the nut device 10 and engaging an annular flange on the corresponding gland. The projecting end of each stem is provided with a suitable handle device for operating it, these handle devices being shown as plain radial handles, 17, 17'. When the valve devices are open the interior of the receptacle 1 or water-column is in communication with the interior of the boiler and hence the receptacle will be filled with water whose level is the same or substantially the same as that of the water in the boiler.

Within the receptacle there is mounted a light-transmitting and reflecting device, which in the best embodiment of the invention comprises a necked portion of such a relatively reduced diameter that it will not offer a large area to the steam pressure within the column or receptacle.

The light-transmitting and reflecting device may be considered as consisting of a plurality of light-transparent prismoidal bodies of different lengths each having a reflecting surface at its lower end. In practice, the said light-transmitting and reflecting device may be made either as one solid piece of transparent material, such as glass or quartz, or of a series of separate prismoidal bodies of such material held together in a suitable manner, as for example, by fusing or cementing them together. The reflecting surface at the lower end of each prismoidal body is produced most advantageously by forming the said bottom end as what is known as a double reflecting prism, that is to say, by providing said bottom end with two sloping surfaces. It will be understood, however, that these prisms accomplish the total reflection of the light by refraction.

In Fig. 1, some of the prismoidal bodies are indicated at $a^1$, $a^2$, $a^3$ respectively, and their sloping surfaces are indicated at $b^1$, $c^1$, $b^2$, $c^2$, $b^3$, $c^3$. The series of prismoidal bodies merge at their upper ends into a conical portion 18 which connects to the neck portion 19, above which neck portion there is a head 20 of larger diameter than the neck.

In the best embodiment of the invention, the conical portion 18, and the neck portion 19, are enclosed by a metallic jacket 21, and it is advantageous to have the inner surface of at least so much of this jacket as surrounds the conical portion 18 arranged to serve as a mirror or reflecting surface, for a reason hereinafter explained.

On top of the receptacle 1, or column, there is detachably secured a device for supporting the light-transmitting and reflecting body. In the present example of the invention this supporting device comprises an annular body 22 having a lower face fitting tightly against the upper edge of the receptacle or column and having a coned exterior surface, indicated at 23, which is engaged by the corresponding oppositely-coned surface of a compression ring 24 secured to the receptacle 1 by bolts 25 passing through a flange 26 on the receptacle, and provided with nuts 27 bearing against the upper surface of the ring 24. In the best embodiment of the invention, the nuts have spherical faces which enter conical recesses in the faces of the ring and therefore seat without binding bolts. The annular body 22 has a bushing 28 arranged to bear against a divided ring 29 which serves to make a cushioned joint around the neck and the head of the light-transmitting and reflecting body. On top of the head 20 of the latter body there is placed a disk 30 of transparent material, such as glass or quartz, a washer 31 of packing material being interposed between the head 20 and the disk 30. This disk 30 may be enclosed by a metallic jacket 21, as shown, in which case the jacket is arranged to surround the head 20, as will be clear from Fig. 6. On top of the disk 30 may be placed a packing washer 31', forming a steam-tight joint.

On top of the annular body 22 there is arranged a prism holder and lamp house, comprising a wall portion 32, a bottom 32ª, a hinged cap 33, and detachable connector 34 by which the lamp house is joined to the annular body 22 in such a manner that the lamp house may be swung back to permit access to the top of the disk 30 to permit cleaning of the latter and of the under side of the large prism, hereinafter referred to, and may also be detached entirely from said annular body 22.

In the present embodiment of the invention, the connector 34 comprises a block fitting on the annular body 22 and latched thereto by a spring bolt 35 (Figs. 1 and 3), whose end enters a recess in said annular body 22. The connector 34 is hinged to the bottom 32ª of the lamp house, as shown in Fig. 3, and the latter is latched to the connector 34 by a spring bolt 36.

Within the lamp house there is arranged a suitable lamp, as for example the incandescent electric lamp indicated at 37, the hinged cap 33 of the lamp house having a lamp socket 33ª to receive and hold said lamp. By turning the hinged cap upward on its hinge, access may be had to the lamp.

Within the lamp house there is located a large prism of transparent material, such as glass or quartz, this being indicated at 38. Between the lamp and the prism there is a shield device comprising a diaphragm 40 and a lens carrier 41, which has a large tubular extension 42 and a small tubular extension 43. In the extension 42 there is mounted a suitable large projecting lens 44 and in the small tubular extension 43 there is located a small lens 45 which projects rays of light at right angles to the rear sloping surfaces of the large prism 38.

The diaphragm 40 has a flange which fits snugly into the upper end of the wall portion 32 of the lamp house, but so that it can be removed when necessary. A spring 46 located between the diaphragm 40 and the prism 38 serves to press the latter yieldingly downward against the bottom 32ª while allowing for the expansion and contraction of the parts.

The prism has a recessed portion in its inclined wall, the bottom of the recess being at right angles to the axis of the large tubular portion 42 and its lens 44.

The front of the wall of the lamp house has a series of windows arranged in a circle, there being as many windows in this series as there are separate prismoidal bodies in the light-transmitting and reflecting device. In addition, there is a central window. The windows in the circular series are marked in the drawings with letters R, G, W and A, while the central window is marked P. The letters indicate contrasting colors of the light which may be emitted from the windows under certain conditions as hereinafter explained. In the present example it is assumed that R means red, G green, W white, and A amber.

The letter P marked on the central window designates some color which will contrast with the other mentioned colors, for example, purple, and this light will show continuously so long as the incandescent lamp is burning. The path of the light from the lamp to this central window will be clear from the dotted lines in Fig. 1.

The coloring of the light emitted from the respective windows may be done conveniently by placing a so-called "jewel" of colored glass in each window.

The operation of the device is as follows:

When the valves are open the water level in the receptacle 1 will be the same as that of the boiler. The space in the receptacle above the water level is filled with steam. The position of the light-transmitting and reflecting body is such that several of the longer prismoidal bodies will project downward beneath the water level so that the double reflecting prisms at their lower ends will be submerged in the water. The other prismoidal bodies will not reach the water and hence the double reflecting prisms at their lower ends will be out of the water. Light from the incandescent lamp will be projected as a circular beam passing downward through the large prism 38, through the disk 30, and through the head 20. Thence the rays travel downward in the general direction of the axes of the respective prismoidal bodies, but following the inner portions of said bodies. When the light transmitted to the lower end of a prismoidal body reaches the inclined surfaces at the inner part of the bottom, its farther course depends upon whether or not the lower end is immersed in water. If not immersed, the light is totally reflected by the inclined surfaces, such as $b^3$, $c^3$, and travels back along the outer part of its prismoidal body, is deflected at the conical portion and finally passes into the prism where it is reflected from the inclined face of said prism to the corresponding window, thus illuminating the latter.

On the other hand, if the light passes downward in a prismoidal body whose lower end is immersed in the water, the said light is not totally reflected but passes into the water and is lost, so that the window corresponding to this prismoidal body remains dark. Hence, in the normal arrangement and operation of this gauge, with the water level at its intermediate position, some of the windows will be dark and others will be illuminated. If the water level falls, more of the windows will be illuminated until finally, when the water level has fallen below the longest prismoidal body, the last window will glow, and this, in the construction illustrated, is arranged to show a red light, indicating danger.

When the water level rises above the normal or intermediate position more of the windows will fail to receive light and will be dark. In a gauge where all of the prismoidal bodies are constructed as has been described hereinbefore, the fact that all the windows of the circular series were dark would indicate that the water level was above the bottom of the shortest prismoidal body. However, in the best embodiment of the invention, means are provided for showing a signal light when the shortest body is submerged at its lower end, in order to give a signal which will attract attention to the fact that the boiler is being overfilled. To do this, the prismoidal body having the shortest length (indicated at $a^4$, Fig. 1) is made with a notch just above its double reflecting end ($b^4$, $c^4$), this notch having an inclined surface $d^4$ which is arranged to refract that light which is travelling upward from its lower end, outward at an angle to the longitudinal axis of said prismoidal body so that this returning light cannot reach its window. But, when the water level has risen high enough to enter the notch, the returning light, instead of being refracted outward at a considerable angle, will pass upward through the water and thus pass the notch, enter the prismoidal body above the notch and proceed to its window, which is thereby illuminated. This window is indicated at G on the drawing and is intended to give a pronounced signal, for example green, to attract attention to the fact that the boiler is being overfilled or certainly has been filled high enough.

In general practice it is assumed that during normal operation the three windows marked W will show white lights and the three windows marked A, as well as the window marked R, will be dark. Also, in the preferred embodiment, having the shortest prismoidal body notched, as above described, the window marked G will be dark. As the water rises slightly, one of the windows marked W will go dark, leaving only two windows marked W illuminated. A further slight rise will cause a second window W to go dark, and so on.

If the water falls below the normal, the three windows marked W will be illuminated and show white light, but also, first one and then another of the windows marked A will be illuminated and show an amber light, which will act as a warning that the water is falling. Finally, when it has fallen below the bottom end of the longest prismoidal body, the red light will appear at the window R.

The central window marked P is intended to be illuminated always, as it receives its light direct from the incandescent lamp through the small tube 43 and its lens 45. If the central window should go dark it indicates that the incandescent lamp 3 is not burning, and therefore, steps can be taken immediately to replace the lamp or make such other repairs as may be required.

In the construction illustrated, the valve handles are connected by a suitable device by which both may be operated simultaneously. This device consists of a long link 50, Fig. 2, connected to the upper handle 17, a yoke 51 connected to the end of said link 50 and to the end of the lower handle $17^1$, and an operating rod 52, connected to an intermediate part of the yoke 51. By pulling down on the rod 52 both handles will be swung in the same direction to close their valves. If one valve seats before the other this will not prevent the closing of the second valve, because the yoke 51 and link 50 will swing and cause the second valve to close. By pushing up on the rod 52 both valves will be opened.

It will be observed that the light-transmitting and reflecting body is immersed in steam or water at all times, so that it is subjected to a pressure from all sides except at the neck 19, where it must withstand the boiler pressure acting upward. However, owing to the reduced area at this neck, the total pressure acting to compress the glass may be made relatively small and well within the limits which it can withstand with safety.

The outer surface of the prismoidal bodies may be treated in any suitable way to protect them from corrosion of the water or of any usual chemicals therein. That is, the light-transmitting and reflecting body may be enameled or plated in any suitable way to resist such corrosion.

When desired, the valves connecting the receptacle 1 with the boiler may be closed, the lamp house removed, the compression ring taken off and the light-transmitting and reflecting body, with its supporting device or annular body 22, may be removed from the receptacle, so that the double reflecting ends of the prismoidal bodies may be cleaned and if necessary repolished. By providing duplicates of such parts for each gauge, one light-transmitting and reflecting body may be replaced by another with no appreciable loss of time, and the one removed may then be put in proper condition and held in reserve for future replacement.

In Figs. 6, 7 and 8 is illustrated a modified form of gauge, the modifications being as follows—The lamp $3^b$ is supported so that the small tubular extension $43^b$ may project rays directly outward from the lamp, a suitable colored jewel, for example of purple glass, indicated at $43^c$, being carried in the end of said tubular extension, so that this light will be seen at the top of the gauge at all times when the lamp is burning.

The large prism $38^b$ has a concave front surface so as to disperse somewhat the rays of light which come from the prismoidal bodies. In front of the large prism there is a lens 60 having a general concavo-convex cross-section, as shown in Fig. 6, though the front surface may be flattened as shown. A suitable metallic casing $32^b$ for holding the lens 60 is detachably connected to the wall of the lamp house, as by bayonet slots in the rear flange $32^c$ of said casing, each slot engaging the head at the inner end of a rivet, one of which is shown at 61, Fig. 6. This casing has windows with jewels, as will be clear from Fig. 7. Also it has a flange with spring fingers 68 which bear against the large prism $38^b$ to hold the latter.

The means for detachably connecting the lamp house to the annular body $22^b$ comprises hinge pintles 62 with a removable pintle pin 63, and a removable locking pin 64, engaging corresponding pintles 65 and 66, as shown in Fig. 7, the locking pin having a bayonet slot arranged to coact with a key 67, Fig. 6.

The general operation of this modified embodiment of the invention will be obvious from the description hereinbefore given in connection with Figs 1 to 5.

What is claimed is:

1. In a liquid level gauge, the combination, with means for transmitting light in a direction transverse to the level of the liquid to be gauged, of a plurality of refracting prisms located at different predetermined levels and arranged to be immersed when reached by the liquid, said refracting prisms being located in the path of the rays of light transmitted by the said transmitting means, and an indicating means arranged to indicate the presence of light received from the respective prisms, said refracting prisms being arranged, when not immersed in the liquid, to change the direction of the light rays transmitted to them by the said transmitting means so as to send said rays to the said indicating means, and, when immersed in the liquid, to send said rays in a direction where they will not reach the indicating means.

2. In a liquid level gauge, the combination, with means for transmitting light in a direction transverse to the level of the liquid to be gauged, of a plurality of refracting prisms located at different predetermined levels and arranged to be immersed when reached by the liquid, said refracting prisms being located in the path of the rays of light transmitted by said transmitting means, and a plurality of indicating devices each arranged to indicate the presence of light received from its respective refracting prism, said refracting prisms being arranged when not immersed in the liquid to change the direction of the rays of light transmitted to them by the said transmitting means so as to send said rays to the said respective indicating devices and, when immersed in the liquid, to send said rays in a direction where they will not reach the respective indicating devices.

3. In a liquid level gauge, the combination, with a source of light, of a light-ray deviating means arranged to be located in the path of vertical travel of the liquid level, whereby the said deviating means will be wetted by the liquid when the level of the liquid reaches said deviating means, said deviating means being located to receive the rays from the source of light, and, when in contact with the liquid, to deviate said rays along one path and when not in contact with the liquid to deviate said rays by reflecting them back along a different path, and means located in one only of the two paths of the deviated rays and arranged to give ocular evidence of the presence of deviated rays of light and of the absence of such light.

4. In a liquid level gauge, the combination, with a series of transparent prismoidal bodies each of which is provided at one end with a refracting prism arranged when not immersed to receive light coming through its respective prismoidal body and return said light through said prismoidal body, and when immersed to send said light into the immersing liquid, said prismoidal bodies being of differing lengths so that their respective refracting prisms will be at different heights, and means in the path of the returned light to indicate its presence.

5. In a liquid level gauge, the combination, with a transparent body having a head, a coned portion below said head and a plurality of prismoidal portions below said coned portion and of different lengths, each prismoidal portion having its terminal end formed as a refracting prism, of means for holding said transparent body by its head with the longitudinal axes of the prismoidal portions transverse to the level of the liquid to be gauged and so that the liquid will reach and wet the respective terminal ends of the prismoidal portions as it rises, a lamp, means for transmitting light from said lamp to the transparent body so that it will reach the respective terminal ends, a plurality of indicating devices, one for each terminal end, and means for deflecting the light rays returned by the terminal ends so that they will reach the respective indicating devices.

6. In a liquid level gauge, the combination, with a transparent body having a head, a coned portion below the head and a plurality of prismoidal portions below said coned portion and of different lengths, each prismoidal portion having its terminal end formed as a refracting prism, one of said prismoidal bodies being provided with a notched portion having a sloping surface arranged to refract light at an angle to the longitudinal axis of said prismoidal body, of means for holding said transparent body by its head with the longitudinal axes of the prismoidal portions transverse to the level of the liquid to be gauged and so that the liquid as it rises will reach and immerse the respective terminal ends and will also, at one level, enter said notch, a source of light arranged to send rays through said transparent body so that it will reach the respective terminal ends, a plurality of indicating devices, one for each terminal end, and means for deflecting the returned light rays so that such rays will fall on the respective indicating devices.

7. In a liquid level gauge, the combination, with a receptacle, a series of transparent prismoidal bodies of different lengths each having a terminal end formed as a double refracting prism, and means for holding said prismoidal bodies with their longitudinal axes transverse to the level of the liquid to be gauged so that the liquid will reach and wet the respective terminal ends as it rises, of a lamp arranged to send its rays to the inner portions of all the prismoidal bodies so that said rays will reach the said terminal ends, a plurality of indicating devices, one for each terminal end, a prism arranged to refract the returned rays from the prismoidal body to the respective indicating devices, and a detachable lamp house arranged to enclose the lamp and said prism.

8. In a liquid level gauge, the combination, with a source of light, of a light-ray deviating means arranged to be located in the path of vertical travel of the liquid level, whereby the said deviating means will be wetted by the liquid when the level of the liquid reaches said deviating means, said deviating means being located to receive the rays from the source of light, and, when in contact with the liquid, to deviate said rays along one path and when not in contact with the liquid to deviate said rays by reflecting them back along a different path, and means located only in the path of said back-reflected deviated rays and arranged to give ocular evidence of the presence of such back-reflected deviated rays of light and of the absence of such light.

9. In a liquid level gauge, the combination, with a source of light, of a light-ray deviating means arranged to be located in the path of vertical travel of the liquid level, whereby the said deviating means will be wetted by the liquid when the level of the liquid reaches said deviating means, said deviating means being located to receive the rays from the source of light, and, when in contact with the liquid, to deviate said rays along one path and when not in contact with the liquid to deviate said rays by reflecting them back along a different path, and means located only in the first-mentioned path of rays deviated by the light-deviating means when in contact with the liquid and arranged to give ocular evidence of the presence of deviated rays of light traveling said first-mentioned path and of the absence of such light.

In testimony whereof, I have hereunto set my hand.

CONSTANT J. KRYZANOWSKY.